J. M. PIOCHE.
CIRCULAR CUTTER FOR TREE FELLING.
APPLICATION FILED NOV. 9, 1918.

1,334,633.

Patented Mar. 23, 1920.

Inventor:
Jean Marie Pioche
By Wm Wallace White
Attorney.

UNITED STATES PATENT OFFICE.

JEAN MARIE PIOCHE, OF ÉTANG-SUR-ARROUX, FRANCE.

CIRCULAR CUTTER FOR TREE-FELLING.

1,334,633.   Specification of Letters Patent.   Patented Mar. 23, 1920.

Application filed November 9, 1918. Serial No. 261,824.

*To all whom it may concern:*

Be it known that I, JEAN MARIE PIOCHE, citizen of the Republic of France, residing at Étang-sur-Arroux, Saône and Loire, in the Republic of France, have invented new and useful Improvements in Circular Cutters for Tree-Felling, of which the following is a specification.

This invention relates to improvements, in circular cutters for tree felling of the kind in which the periphery is provided with a series of special shaped teeth formed by the recurrence of three types of teeth: 1, one knife tooth the cutting edge of which is situated on the upper surface of the disk or cutter; 2 another knife tooth the cutting edge of which is placed on the lower surface of the disk and a planing tooth having the same thickness throughout as the said disk or cutter. The improvements which form the object of my invention consist in providing on the periphery of the cutter one or several groups of teeth suitably spaced, each group comprising two knife teeth of a different type followed by a planing tooth.

If desired, the knife teeth could as regards their periphery have the shape of a semi-circular curve arranged in such a manner as to assume as an axis of symmetry a radius of the disk or cutter.

The characteristic features above mentioned may obviously appear separately or in combination in a circular cutter according to the invention.

Figure 1:
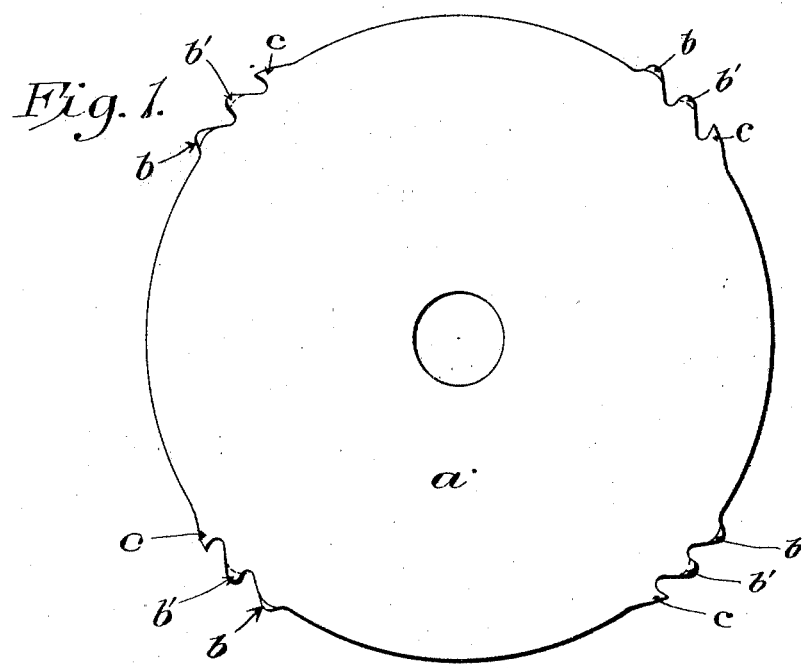

In the accompanying drawings shown by way of example:

Figure 1 is a plan view of a circular cutter provided with four spaced groups of teeth.

Figure 2:
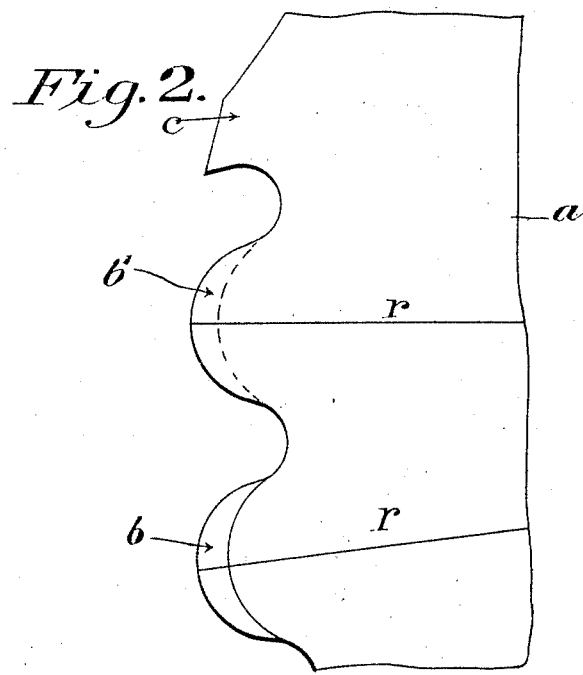

Fig. 2 shows on an enlarged scale a plan view of a cutter segment provided with knife teeth having a semicircular periphery. As shown in Fig. 1, the circular knife may be formed of a disk $a$ provided on its periphery with any suitable number of spaced teeth groups, each group comprising a knife tooth of the $b$ type, a knife tooth of the $b^1$ type and a planing tooth $c$. The latter is placed after the two knife teeth so that when the circular cutter is at work, the knife teeth $b$ produce in the trunk a first incision, the knife teeth $b^1$ produce a second incision close to the first one and the planing teeth $c$ which are slightly backward relatively to the knife teeth carry away and expel the slight wooden slice left by the knives between the two cutting planes.

With the above described arrangement, not only is the cut considerably improved but the manufacture of the circular cutter is thereby greatly simplified, its cost price is considerably lowered, and the sharpening operation is greatly shortened.

It will be seen on Fig. 2 that the knife teeth $b$ and $b^1$ while being cut as shown may assume as regards their periphery the shape of a semi-circular curve arranged to have as an axis of symmetry a given radius $r$ of the cutter.

The above described circular cutter has been given by way of example and it is obvious that without departing from the nature of the invention not only may the number of teeth groups be modified but also the number and the arrangement of teeth of each group. It may however be remarked that in some cases good results may be obtained with a circular cutter provided with only a single group of teeth.

Having now described my invention what I claim as new and desire to secure by Letters Patent is:

1. A circular cutter formed of a disk and teeth groups so spaced thereon that only one of them is in engagement with the timber at the same time, each group comprising two knife teeth the cutting edges of which are respectively on the upper and lower surfaces of the disk and a planing tooth having throughout the same thickness as the disk substantially as herein described and for the purpose set forth.

2. A circular cutter formed of a disk and suitably spaced teeth groups thereon the peripheral distance between two adjacent groups being equal to about three times the circumferential extent of one group, each group comprising two knife teeth the cutting edges of which are respectively on the upper and lower surfaces of the disk and a planing tooth having throughout the same thickness as the disk substantially as herein described and for the purpose set forth.

In testimony whereof I have signed my name to this specification.

JEAN MARIE PIOCHE.